United States Patent [19]

Neubauer et al.

[11] Patent Number: 5,598,076
[45] Date of Patent: Jan. 28, 1997

[54] PROCESS FOR OPTIMIZING CONTROL PARAMETERS FOR A SYSTEM HAVING AN ACTUAL BEHAVIOR DEPENDING ON THE CONTROL PARAMETERS

[75] Inventors: Werner Neubauer; Siegfried Bocionek; Marcus Möller, all of München; Martin Joppich, Unterhaching, all of Germany

[73] Assignee: Siemens Aktiengesellschaft, Munich, Germany

[21] Appl. No.: 244,756

[22] PCT Filed: Dec. 4, 1992

[86] PCT No.: PCT/DE92/01017

§ 371 Date: Jun. 9, 1994

§ 102(e) Date: Jun. 9, 1994

[87] PCT Pub. No.: WO93/12475

PCT Pub. Date: Jun. 24, 1994

[30] Foreign Application Priority Data

Dec. 9, 1991 [DE] Germany ................. 41 40 550.1

[51] Int. Cl.$^6$ ................................. G05B 19/408
[52] U.S. Cl. ................. 348/568.22; 318/568.13; 318/568.15; 318/568.23; 318/568.21; 395/900; 395/21; 395/20; 364/474.12; 364/474.15; 364/151
[58] Field of Search ............ 318/568.22, 568.23, 318/568.24, 568.13, 568.15, 565, 561, 563, 569, 567; 364/151, 157, 148, 150, 474.15, 474.12, 474.13; 395/900, 21, 20

[56] References Cited

U.S. PATENT DOCUMENTS

| 5,016,188 | 5/1991 | Lan | 364/148 |
| 5,162,997 | 11/1992 | Takahashi | 364/150 |
| 5,177,625 | 1/1993 | Nakashima et al. | 364/151 |
| 5,268,834 | 12/1993 | Sanner et al. | 364/151 |

OTHER PUBLICATIONS

F. Garnich et al., "Laserrobotic for 3D cutting and welding" Proc. of the European Conference on Optics (ECO III), The Hague (NL), Mar. 1990.

E. Freund, "Fast Nonlinear Control With Arbitrary Pole–Placement For Industrial Robots And Manipulators", Int. J. of Robotics Research, vol. 1, No. 1, pp. 65–78.

C. G. Atkeson et al., "Robot Trajectory Learning Through Practice", Proc of 1986 IEEE Conf. on Robotics and Automation, pp. 1737–1742 (1986).

A. Balesdtrino et al., "An Adaptive Model Following Control For Robotic Manipulators", Trans. ASME J. of DSMC, vol. 105, pp. 143–151 (1983).

S. Dubowsky et al., "The Application of Model–Referenced Adaptive Control To Robotic Manipulators", Trans. ASME J. of DSMC, vol. 101, pp. 193–200 (1979).

J. O. Berg: Robot Calibration for Off–Line Programming. Industrial Robot, vol. 18, No. 2, 1991, pp. 29–31.

S. Arimoto: in M. Brady (ed.); Robotics Science, pp. 349–377, MIT Press (1989).

M. W. Spong: Modeling and control of Elastic Joint Robots, in F. W. Paul and K. Youcef–Toumi (eds.): Robotics: Theory and Applications, DSC–vol. 3 (presented at the winter Annual Meeting of ASME), pp. 57–65 (1986).

(List continued on next page.)

*Primary Examiner*—Karen Masih
*Attorney, Agent, or Firm*—Hill, Steadman & Simpson

[57] ABSTRACT

A process for optimizing the control parameters of the operation of a system, such as a robotic system or heating system, provides that a trainable component or model is taught the actual behavior of the system, the difference or deviation of the actual behavior from a reference behavior of the system is determined and correction values are provided. New control parameters are determined which take into account the correction values. The determination of the deviation and the incorporation of the correction values is continued until the difference of the actual behavior from the reference behavior is below a predetermined value.

10 Claims, 11 Drawing Sheets

OTHER PUBLICATIONS

V. D. Sanchez, A. and G. Hirzinger: State-of-the-art Robot Learning Control based on Artificial Neural Networks—An overview. To appear in: O. Khatib et al. (ed.): The Robotics Review 2, MIT Press (1991).

J. Y. S. Luh, M. W. Walker and P. C. Paul: Online Computation Scheme for Mechanical Manipulators. ASME Trans. J. Dynam. Syst. Measure. Control, vol. 102, pp. 69–76 (1980).

N. N.: Consistent Welds Automatically: Description of Meta Torch Sensor Family. Meta Machines Ltd., Oxford (UK).

G. Leininger: Adaptive Control of Manipulators Using Self-Tuning Methods, in M. Brady and R. P. Paul (eds.): Robotics Research: First International Symposium, MIT Press (1984).

A. J. Koivo and T. H. Guo: Adaptive Linear Controller for Robotic Manipulators. IEEE Trans. on Automatic Control, Vol. AC–28, pp. 162–171(1983).

J. M. Hollerbach: A Recursive Lagrangian Formulation of Manipulator Dynamics and a Comparative Study of Dynamic FormulationComplexity. IEEE Trans. Syst. Man. Cybernet, vol. SMC–10, pp. 730–736 (1980).

E. G. Gilbert and I. J. Ha: An approach to Nonlinear Feedback Control with Application to Robotics, Proc. 22nd IEEE CDC, San Antonio (1983).

G. Casareo and R. Marino: On the Controllability Properties of Elastic Robots. 6 Int. Conf. on Analysis and Optimization of Systems, INRiA, Nice (1984).

S. Arimoto from Brady (ed): Robotics Science, MIT Press (1989), pp. 349–377.

V. D. Sanchez A. and G. Hirzinger, "State-of-the-art Robot Learning Control based on Artificial Neural Networks—An Overview—", from Okhatib et al. (ed) The Robotics Review 2 MIT Press (1991), pp. 1–15–15–15.

FIG 6A
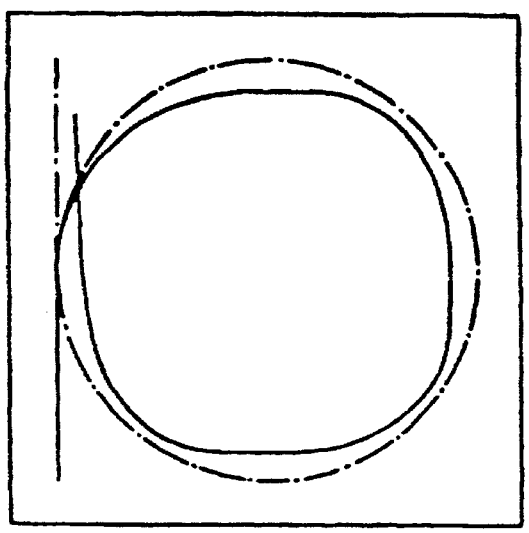
—·—·— REFERENCE TRAJECTORY
········ CONTROL PARAMETERS
———— ACTUAL TRAJECTORY
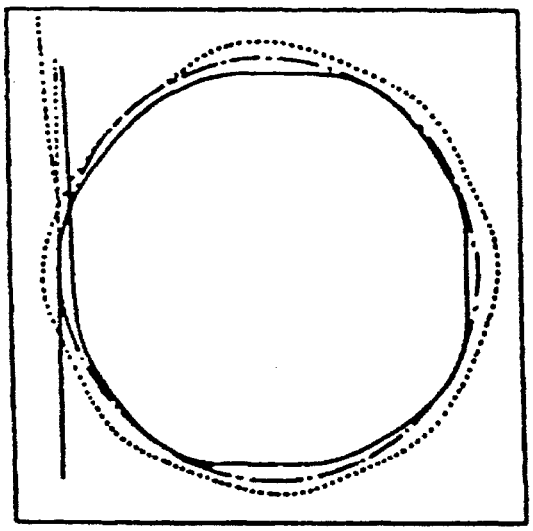
FIG 6B
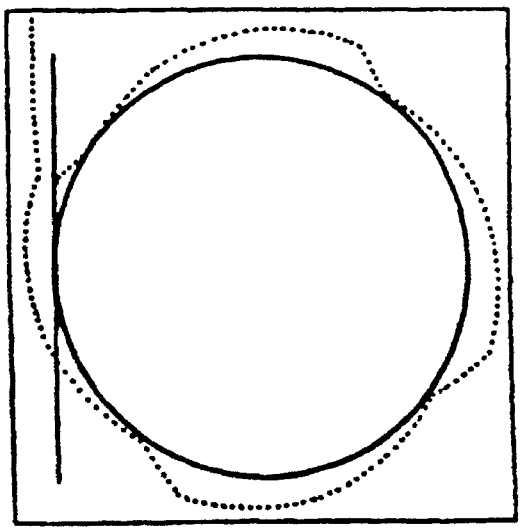
FIG 6C 2. Phase teaching the control parameters with the forward system model

FIG 15     1. Phase teaching the neural net to the backward system model

FIG 16  2.Phase teaching the control parameters with the backward system model 3.System operation

PROCESS FOR OPTIMIZING CONTROL PARAMETERS FOR A SYSTEM HAVING AN ACTUAL BEHAVIOR DEPENDING ON THE CONTROL PARAMETERS

BACKGROUND OF THE INVENTION

1. Field of the Invention

The present invention relates generally to a process for optimizing the control parameters of a system by measuring differences between an actual behavior and a desired behavior.

2. Description of the Related Art

In modern manufacturing equipment, for reasons of cost, time and staff savings, manufacturing systems are frequently employed which are very complex and the correct functioning of which is dependent on a multiplicity of control parameters. It is particularly important here that such control parameters that bring about a correct actual behavior in relation to the reference behavior of such a system are available as a function of time. This means that the parameters must be such that the actual behavior of the system corresponds as closely as possible to the reference behavior.

Some examples of such systems are:

Robot arms which move a tool, such as a laser or burr removing tool, for example, which is to be guided along a particular contour line of a workpiece.

Heating systems which are intended to impart a particular temperature profile to a workpiece.

In order to be able to control such systems, it is necessary to know and describe their response characteristics very precisely. For control one can attempt to record the response characteristics of the systems in higher-order differential equations. In the case of mechanical systems, such as a robot arm for example, the differential equation would be influenced by the weight of the tool, the weight of the individual arms, the moments of inertia that occur during movements, the torques of the motors and the manner in which the individual joints and the sections of the robot arm connected thereto are positioned. It is already evident from the above that a very complex differential equation would result with the known variables. A further complicating factor is the fact that the systems, such as a robot arm for example, exhibit nonlinearities. The nonlinearities consist, for example, of the play in the joints, of the play in the speed-transforming transmissions and of the positioning imprecision of the servos. These variables are not predictable and therefore cannot be described either.

Analogously, other nonlinearities are conceivable in the case of heating controllers, such as, for example, the thermal conductivity coefficient of the insulation, the different reflection behavior of the heated material, convection influences, different ambient temperatures, etc.

In order to be able to employ such expensive investment goods, such as robots for example, in the production process for as long as possible, there are methods for determining the parameters of these systems without using a robot. In the case of robot arms which guide tools, for example, it is necessary to specify coordinates along which the robot is to guide the tool. A travel trajectory is then produced by the chronological sequence of the coordinates. One method for determining such xy coordinates is, for example, that of simulating a robot arm. In this case the model of a robot arm containing all the known variables of the robot arm is described in a computer. This description includes, for example, the geometry, the kinematic and the dynamic behavior of the robot, of the workpieces and of the machines, and also the behavior of the sensors where they are relevant to the simulation.

It is also particularly important in this connection that the control behavior of the robot is also taken into account in such simulation models.

Control parameters are then supplied to the model, xy coordinates in the case of a robot arm and possibly also z coordinates of a travel trajectory. The actual behavior of the robot arm then becomes apparent from the simulation, which can then be compared with the known reference behavior, namely the coordinates of the trajectory. The control parameters, that is to say the coordinates for the robot model, can be optimized on the basis of this comparison.

It is then possible to drive the real robot with the control parameters optimized on the model in this way. As a result of the aforesaid nonlinearities it will not have the reference behavior, that is to say the reference trajectory will be described more or less precisely by the robot arm. It is then necessary for a person to optimize the coordinates, that is to say the control parameters, for the real robot in a time-consuming process. In the case of laser cutting and burr removal, for example, this also involves the use of a large amount of material since real workpieces are machined. Another method of teaching robot arms travel trajectories is the direct teach-in process, in which the individual coordinates lying on the trajectory that the robot is to describe during the manufacturing process are approached point-by-point, and after all the coordinate points have been entered the person also optimizes the dynamic behavior and specifies the control parameters accordingly.

It would be a great advantage if this step of control parameter optimization could also be automated. Conventional methods of speeding up this optimization process are aimed at improving the control of the robot.

Two of the most important techniques are the "Nonlinear Control" theory and the "Computed Torque" method. With respect to the first group, Casareo and Mariano and Spong describe a linearized feedback, and Freund proposes a nonlinear transformation for decoupling the nonlinearities of the robot dynamics. They all assume that the inertia matrix is fully known. A very exact robot model is therefore required for these techniques.

If a model of robot dynamics in real-time along a desired trajectory can be calculated, then the drive moments for each joint can be recalculated for each instruction transferred from the robot controller. This is referred to as the "Computed Torque" or "Inverse Dynamics" method. As a result of the difficulty of modeling, errors caused by play and friction in the joints, different loading or inertia effects cannot be avoided.

A further technique is the so-called "Model Reference Adaptive Control". With this adaptive process, control is executed in such a way that the difference between the actual behavior calculated with a model (second-order damped system) and the current actual behavior of the robot is minimized. Owing to the fact that the comparison is with a model and not with the desired trajectory, errors inevitably occur if the model is not very exact.

In order to reduce these errors Arimoto and others have presented a new method termed "Learning Control". Analogously to this technique, Potthast and Tio determine the parameters of an inverse linear system model based on the comparison between the input and output signal of a CNC machine. Using the inverse system model, the CNC program (input signal, control parameters) is subsequently modified before execution in such a way that the output signal matches the desired trajectory. With this process the original control parameters have to be modified before every execution. Errors in the system model also lead to deviations from the reference behavior.

The inclusion of nonlinearities in the model is seen as a suitable step in the direction of improving the system model. D. Psaltis et al. (the publication by D. Psaltis, A. Sideris, and A. Yamamura, entitled Neural Controllers, Proc. IEEE First Int'l. Conf. Neural Networks, San Diego, Calif., June 21–24, pp. 51–58, (1987) and the publication by D. Psaltis, A. Sideris and A. Yamamura entitled A Multilayered Neural Network Controller, IEEE Control Systems Magazine 8, pp.17–21 (1988)) use for this purpose a multilayer neural network that can be trained on-line.

W. T. Miller III et al. (the publication by W. T. Miller III, F. H. Glanz and L. G. Kraft III entitled Application of General Learning to the Control of Robotic Manipulators, The Int. J. of Robotics Research 6, pp.84–98 (1987), the publication by W. T. Miller III entitled Real-time Application of Neural Networks for Sensor-based Control of Robots with Vision, IEEE Trans. SMC 19, pp.825–831 (1989), and the publication by W. T. Miller III, R. P. Howes, F. H. Glanz and L. G. Kraft III entitled Real-time Control of an Industrial Manipulator using a Neural-Network-based Learning Controller, IEEE Trans. Robotics and Automation 6, pp.1–9 (1990)) use an approximation model of the robot dynamics valid only for specific regions of the working area, for which a neural network is trained. The learning rule applied is similar to the Widrow-Hoff learning rule for adaptive elements.

Further processes for optimizing control parameters for a system having an actual behavior depending on the control parameters which in particular do not affect the control of the system are not known.

SUMMARY OF THE INVENTION

An object of the invention is to provide a process for optimizing control parameters for a system having an actual behavior depending on the control parameters. This and other objects and advantages of the invention are achieved by a process for generating control parameters for a reference behavior of a system having an actual behavior depending on the control parameters, a) wherein in a first step a trainable component is taught the actual behavior of the system, b) wherein in a second step the difference between reference behavior and actual behavior of the system, as reference deviation, is determined as a function of the control parameters and is supplied to at least one trainable component to which the actual behavior of the system has been taught, and the component provides a correction value for the control parameters corresponding to the reference deviation, c) wherein in a third step new control parameters are determined with the aid of the correction value in such a way that they bring about an improvement of the actual behavior with respect to the reference behavior of the system, and d) wherein at least the steps b) and c) are performed until the difference between reference behavior and actual behavior of the system falls below a predetermined value.

A particular advantage of the process according to the invention is that the actual behavior of the system need be determined and learnt only once, and the correct control parameters need be defined only once. It is then possible to supply the optimized control parameters to it during operation and no control is necessary. A further advantage of the process according to the invention is that an attempt is not being made here to improve the control of the system, but rather the nonlinearities of the system, the type of which it is not necessary to know, are compensated via the control parameters.

It is particularly advantageous to employ neural networks as trainable components, since there are adequate computer models for trainable component and since they are also capable of learning nonlinear system behavior.

In a system having a minimum phase behavior, it is particular favorable to learn an inverse system model. In this case the inverse system model is stable. The advantage consists in that it is possible to find a correction value for the input control parameter directly via the inverse model with the reference deviation.

In the case of systems that have no minimum phase response characteristics, it is favorable to employ two identical forward system models for parameter optimization. In this case the optimized correction value for the control parameters is found iteratively by application of an artificial parameter modification.

The use of the process according to the invention is particularly favorable for robot arms since a variety of simulation models are available for robot controllers and robot arms, and since human activity can be automated by employing the process.

The use of the process according to the invention can also be favorable for determining optimum parameters for bringing about the temperature profiles, since in this case too the optimum adjustment is time-consuming.

The use of sensors to determine the actual behavior of a system can also be particularly advantageous, since data with which a neural network can be trained are obtained directly.

It can also be advantageous to employ a neural network capable of learning linear system behavior, since the models for this are simpler and also since such networks are sometimes suitable for compensating nonlinearities during the parameter optimization.

It is particularly advantageous to employ neural networks that can also learn nonlinear response characteristics of the system. Thus, an inverse stable nonlinear system model is available which determines better correction values for the control parameters and hence reduces the number of optimization steps for the control parameters.

To improve the operation of the network, a transformer provides the neural networks in a preprocessed form with the particular values from actual behavior and control parameters required for describing the system behavior at one point in time.

Further developments of the invention include improving the process as mentioned above wherein the trainable component is a neural network which is taught, in that, for simulating the actual behavior, at least one control parameter is weighted at least one neuron. This process may also provide that the neural network learns a linear behavior of a system. Such training can specify that the neural network learns nonlinear behavior of a system in that the control parameters supplied for training the system are coded.

The process provides that a transformer assigns to at least one neuron a subset of the control parameters known from the actual behavior for learning the system behavior. The process may further include the system having at least minimum-phase behavior, wherein the trainable component is taught in such a way that it is capable of determining the associated control parameters from the actual behavior of the system, and wherein a control parameter deviation is determined from the reference deviation which is combined with the control parameters that brought about the reference deviation.

This process can preferably include two identically taught trainable components being used as models, wherein one model receives the same control parameter as the system and the other model receives modified control parameters, and a deviation is obtained by comparing the actual behavior of the two models brought about, which deviation corresponds to the modification of the control parameters on the second model, wherein the modification is adapted iteratively in such a way that the square of the sum of the reference deviation brought about by the system and a linear combination of the deviation brought about by the models becomes minimal, and the modification Of the control parameters found in this way is combined with the particular control parameters that brought about the reference deviation of the system.

A further improvement in the invention provides that the process is used in a system which is a robot arm that guides a tool, and the control parameters are coordinate specifications which are to be included in a trajectory along which the robot is to guide the tool, and wherein the actual behavior of the system is described by the trajectory.

BRIEF DESCRIPTION OF THE DRAWINGS

The invention and its exemplary embodiments will be described in more detail in the text below with reference to figures.

FIGS. 6A, 6B and 6C show various steps during the parameter optimization with the process according to the invention.

DETAILED DESCRIPTION OF THE PREFERRED EMBODIMENTS

Figure 1:
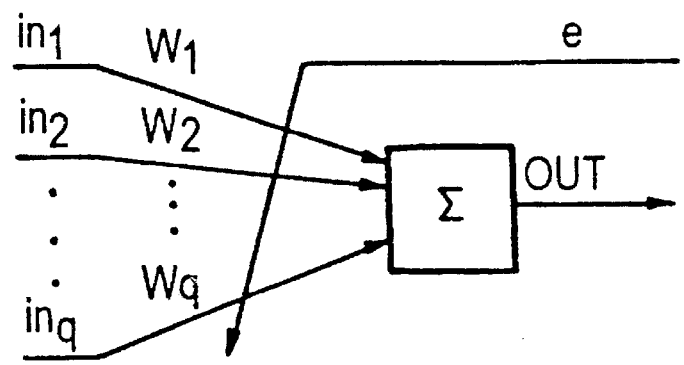
FIG. 1 shows the learning process at a neuron of a neural network to which various input parameters are supplied.

FIG. 1 shows the neuron of a neural network. It is denoted by $\Sigma$. The neuron has q inputs in1, in2 to inq, which are denoted by arrows, and weighting factors w1, w2 to wq are shown at the respective inputs of the neuron. The neuron has the output out. Denoted by e, the measured error between actual behavior and reference behavior is the reference deviation.

The output out is calculated with out=wT·in. The network is trained using the delta rule of Widrow-Hoff.

$$wnew = wold + \epsilon \cdot e(i) \cdot in$$

$$i \text{ in } l2$$

i being randomly selected from (1 ... N).

e(i) is the measured error here between actual and reference path at the ith point of, for example, a robot trajectory and $\epsilon$ is the learning increment. In a system with linear response characteristics, $\epsilon$ can be maintained at 1.0 in order to achieve the fastest possible convergence. In a system with nonlinear response characteristics, however, $\epsilon$ must be reduced slowly to 0 in order to achieve the convergence of the system model. If there are nonlinearities in the system, however, a linear inverse system model can very easily become unstable and thus unsuitable for the parameter optimization.

Figure 2:
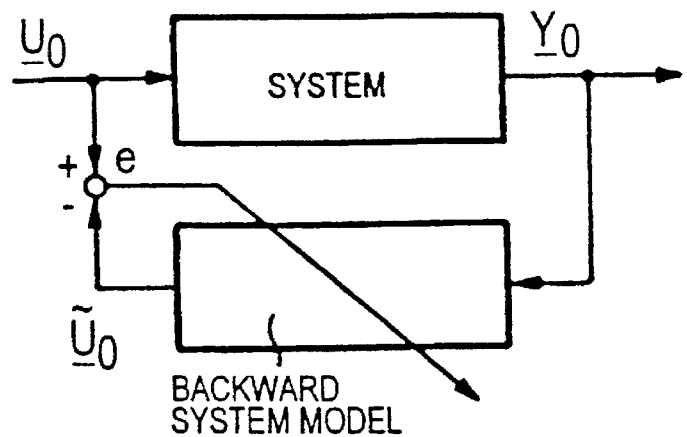
FIG. 2 shows the learning of the inverse system.

FIG. 2 shows the learning of the inverse system by way of example. The input parameters here are denoted by u0 and the output parameters of the system are denoted by y0. In addition, the deviation e is shown and the response of the system model u■0. The training of the system proceeds as follows: the system is driven with the parameter u0 and a sensor determines the parameter y0 as system response. The parameter is supplied to the input of the system model which corresponds to the input in described in FIG. 1. The system model provides u■0 as a response to y0. At a comparison point the deviation e between u■0 and u0 is determined. The weighting factors w at the corresponding input in, to which y0 is supplied, are iteratively modified until e, that is to say the difference between u■0 and u0, is as small as possible. The system model has then been trained.

Figure 3:
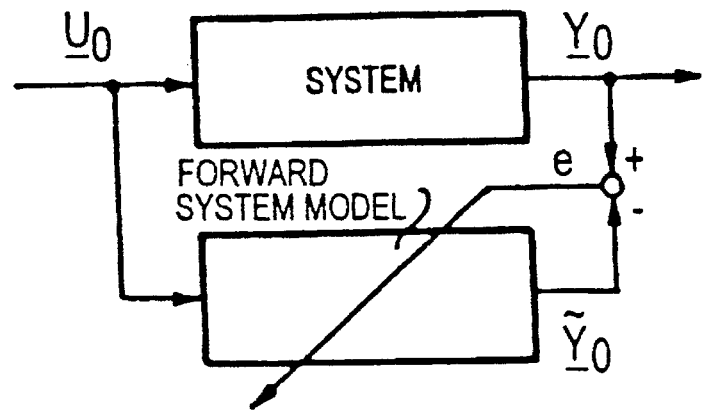
FIG. 3 shows the learning of the forward system.

FIG. 3 shows the learning of a forward system. Analogously to FIG. 2, a value, a parameter u0, is supplied to the system, which provides the value y0 at the output. In contrast to FIG. 2, however, the same value u0 is supplied to the system model, which then produces a value y■0 on the system model. The two system responses, on the one hand that of the real system y0 and on the other hand that of the system model y0 are combined with one another at a comparison point and produce a deviation e. The system model is now trained until e is minimal, that is to say the weighting factors at the inputs of the neural network that is to simulate the system are adapted in an analogous manner to that illustrated in detail in FIG. 1.

Figure 4:
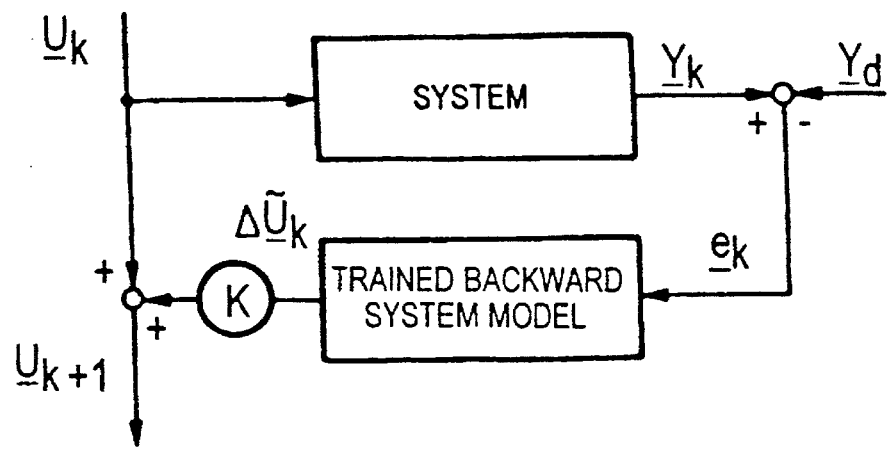
FIG. 4 shows the parameter optimization with the inverse system model.

FIG. 4 illustrates the parameter optimization with an inverse system model by way of example. Once the neural network has achieved a stable state, it can be used for minimizing the reference deviation. In this case the system response is denoted by yk and the desired reference value is denoted by yd. The value yk is produced on the system by the parameter uk. The comparison of yk and yd provides the reference deviation ek. The latter is supplied to the system model and, analogously to the reference deviation ek, provides a value ■u■k. This value is weighted linearly with k in order to avoid oscillations of the control loop and is added to the input value of the system, the input parameter uk. The input parameter uk is thus modified. The procedure with the new value uk+1 is then analogous to that for uk. The iterative optimization process runs until ek falls below a previously defined value.

Figure 5:
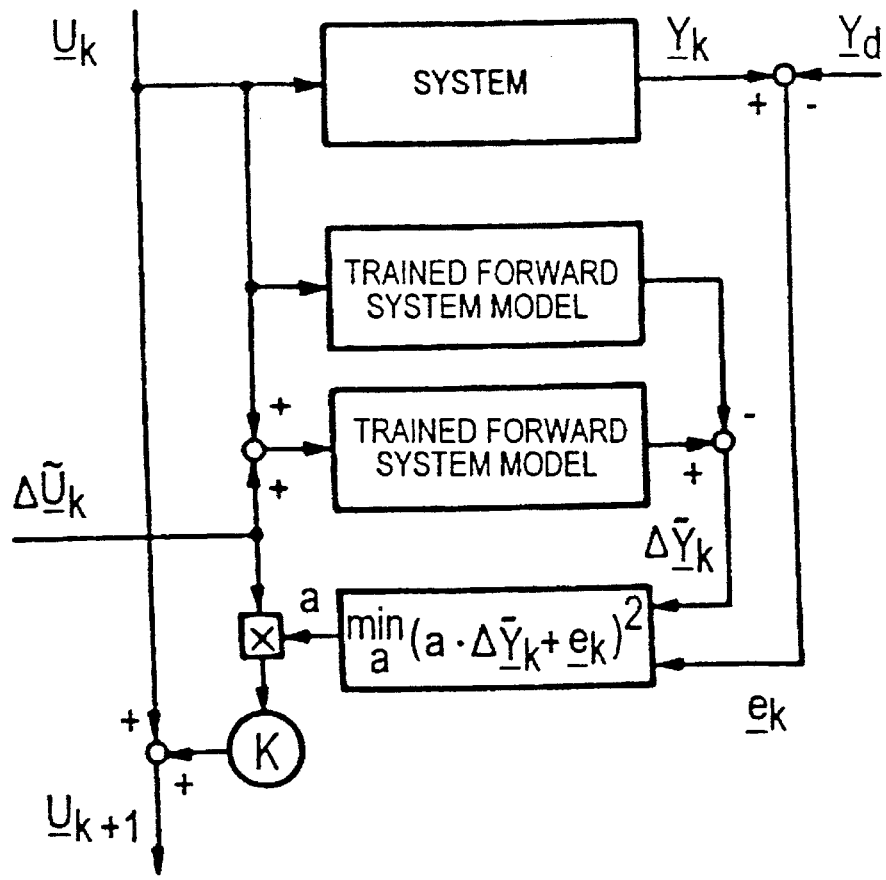
FIG. 5 shows the parameter optimization with two identical forward system models.
Figure 7:
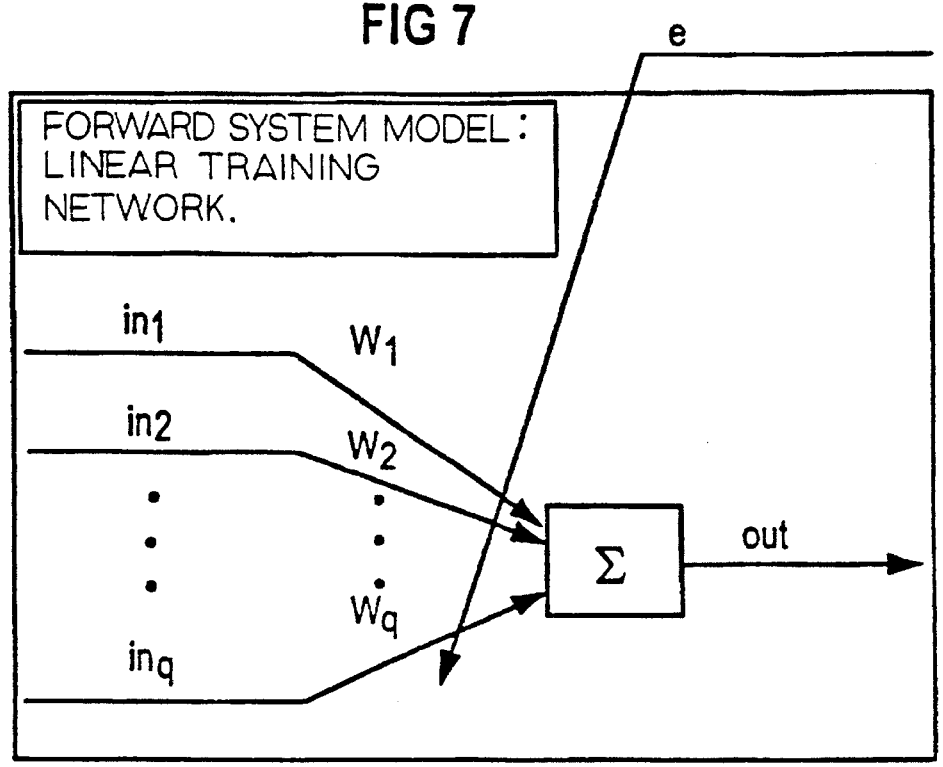
FIG. 7 shows a forward system model linear traning network.
Figure 8:
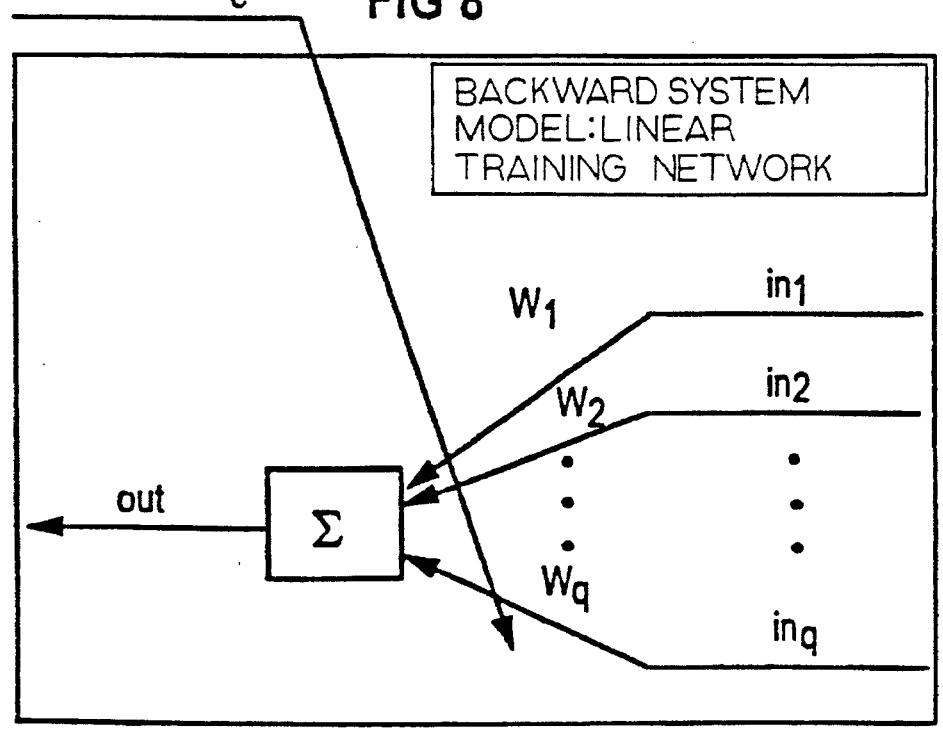
FIG. 8 shows a backward system model linear traning network.
Figure 9:
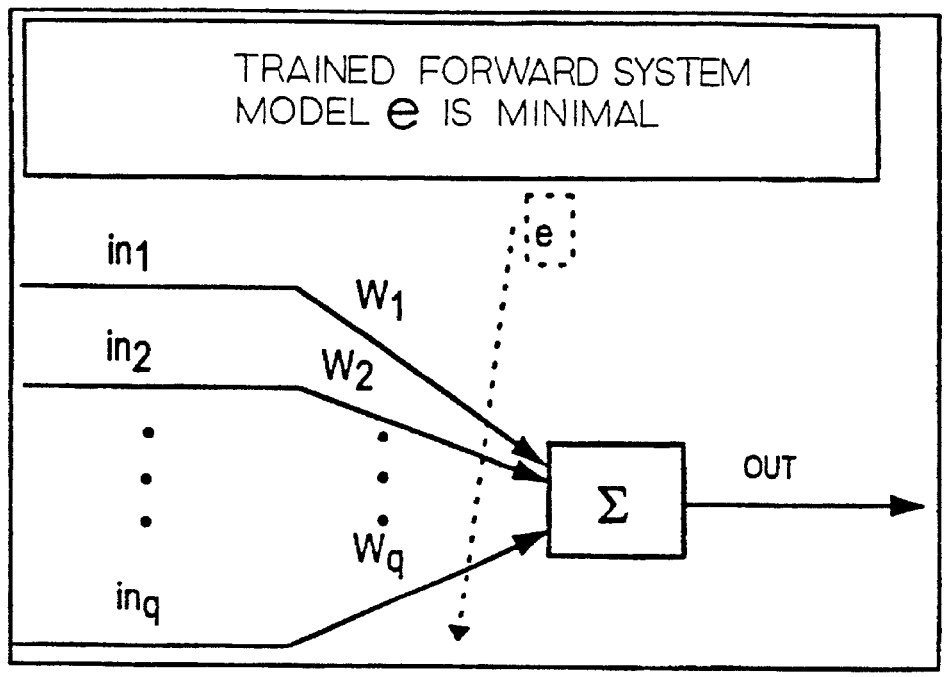
FIG. 9 shows a trained forward system model.
Figure 10:
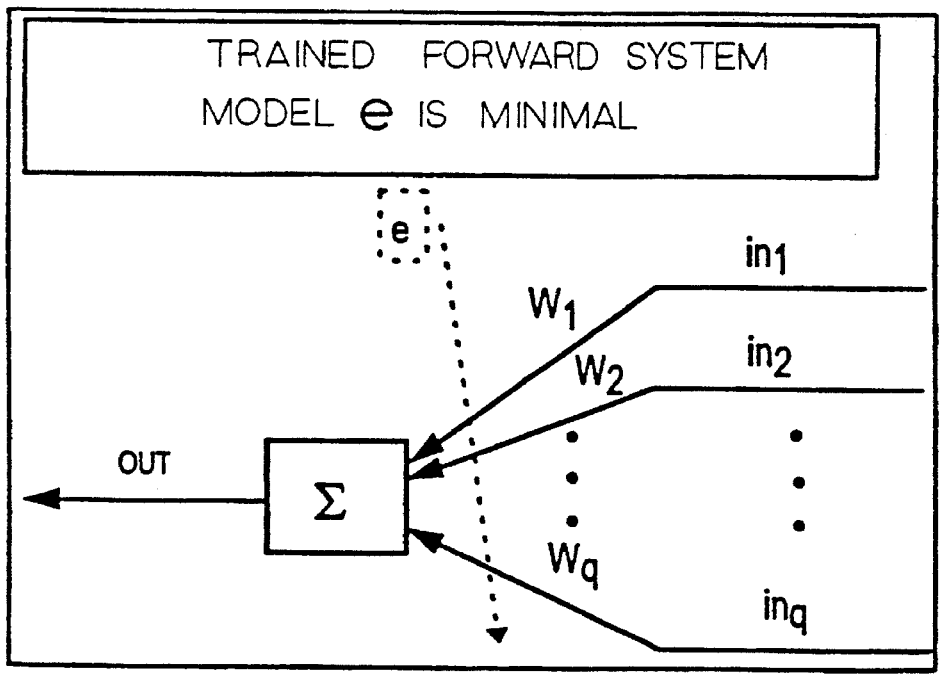
FIG. 10 shows a trained backward system model.
Figure 11:
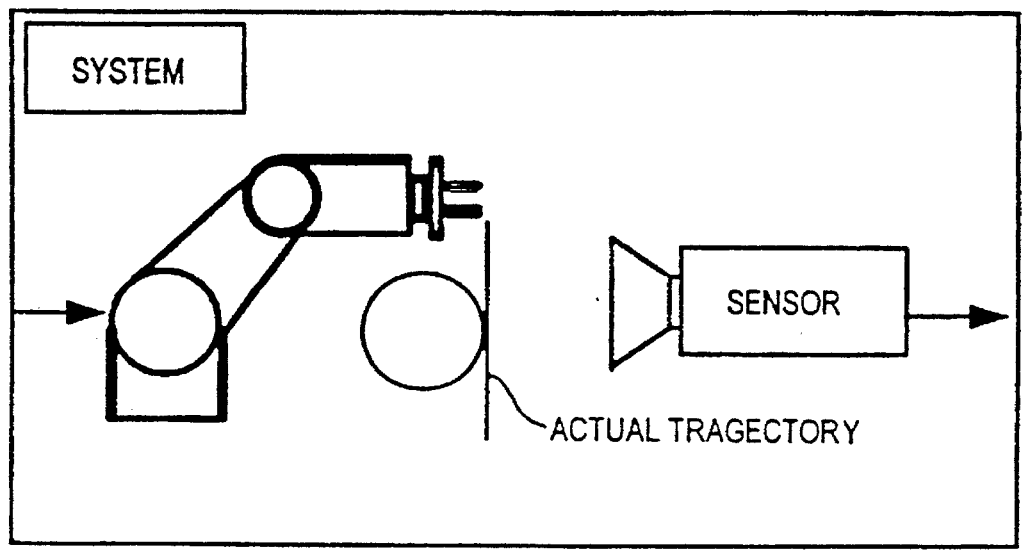
FIG. 11 is a schematic drawing of a system for the present invention.
Figure 12:
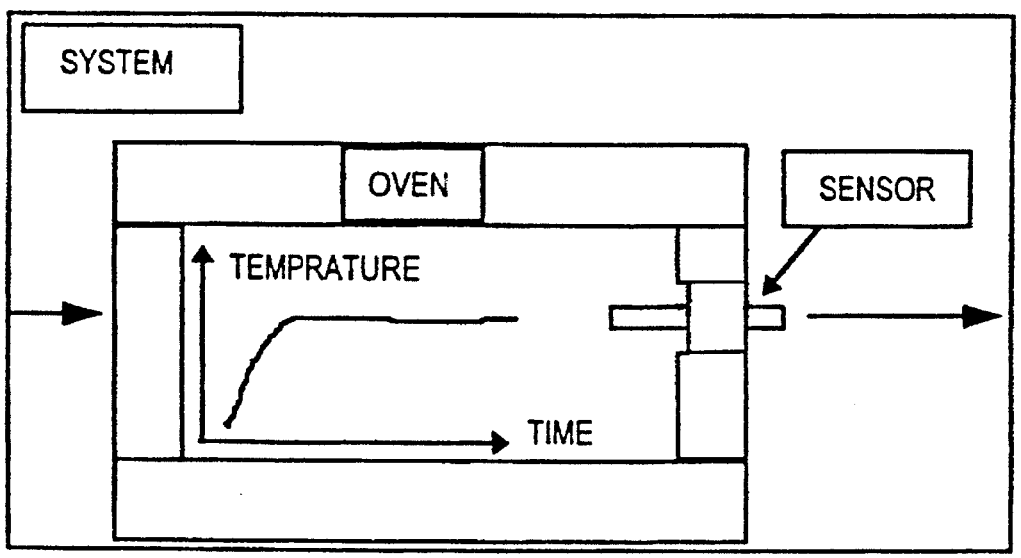
FIG. 12 is another system for the present invention.
Figure 13:
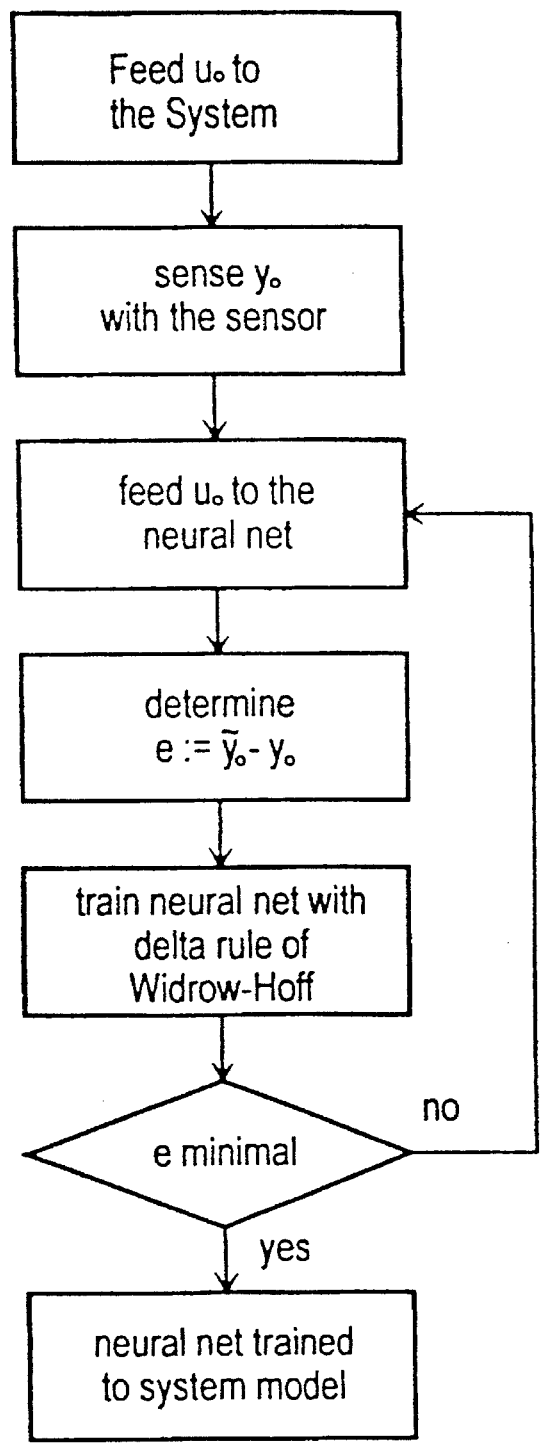
FIG. 13 is a flow chart of teaching the neural net.
Figure 14:
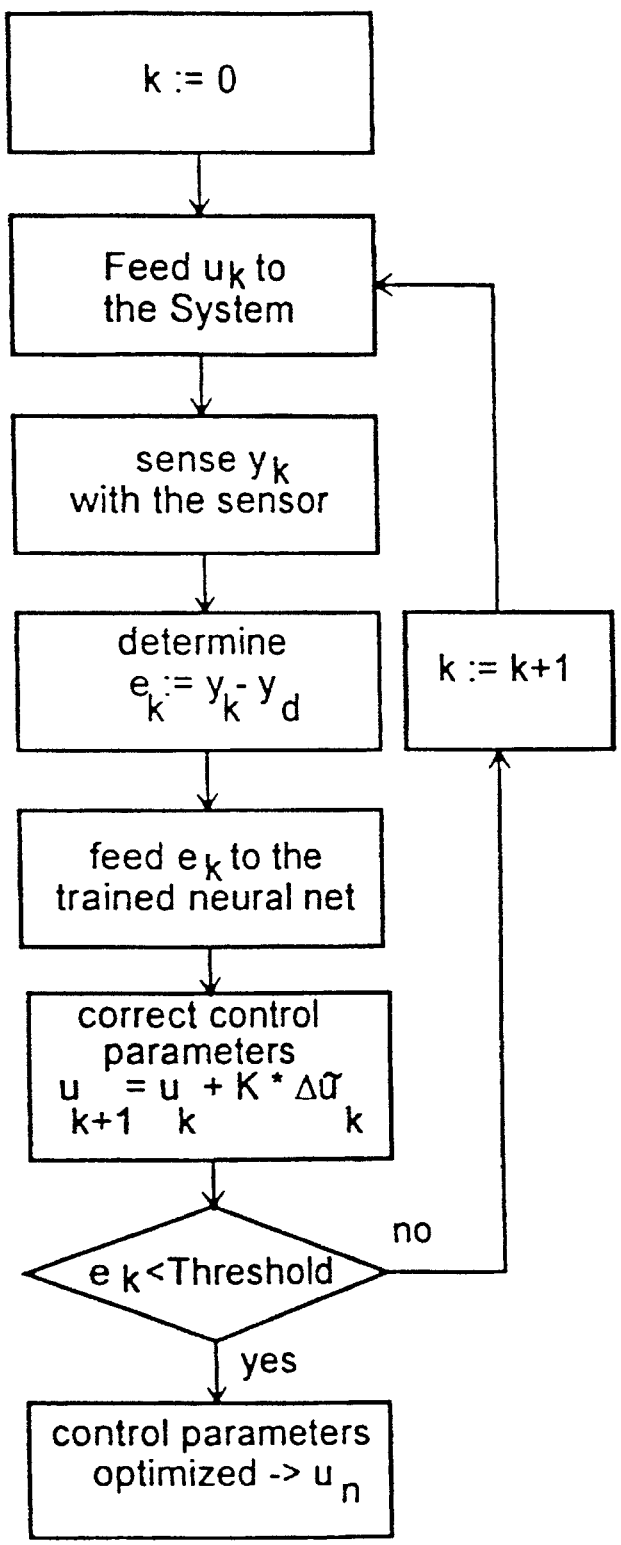
FIG. 14 is a flow chart of teaching control parameters for a forward system.
Figure 15:
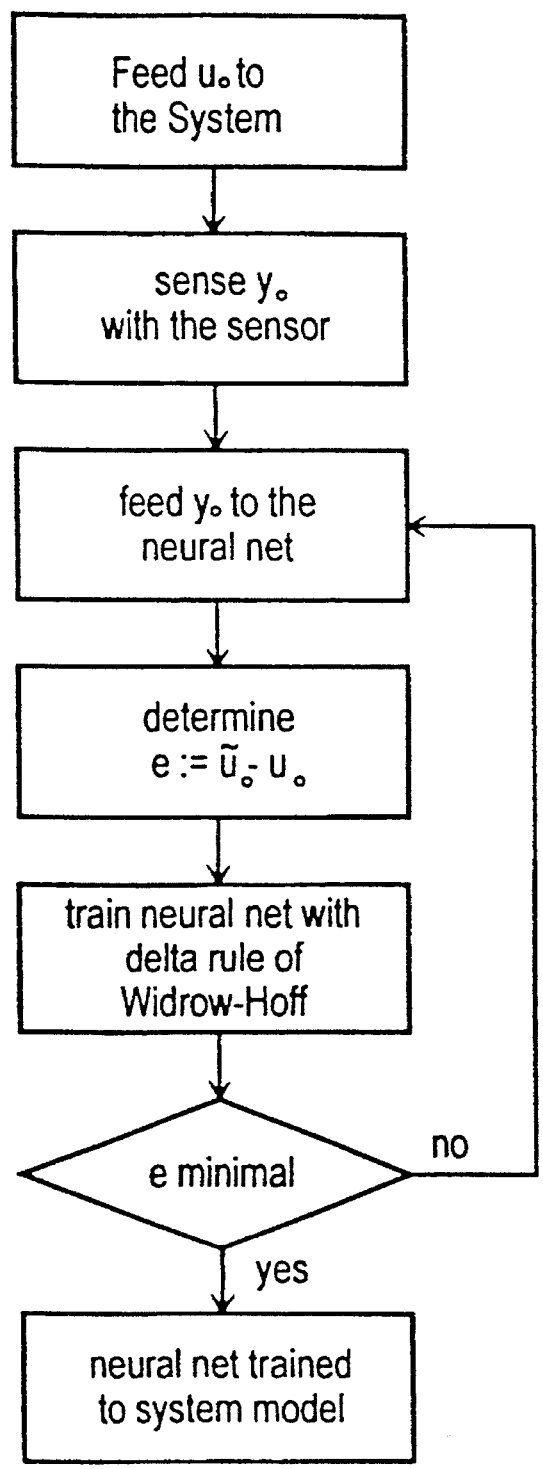
FIG. 15 is a flow chart of teaching the neural net to a backward system.
Figure 16:
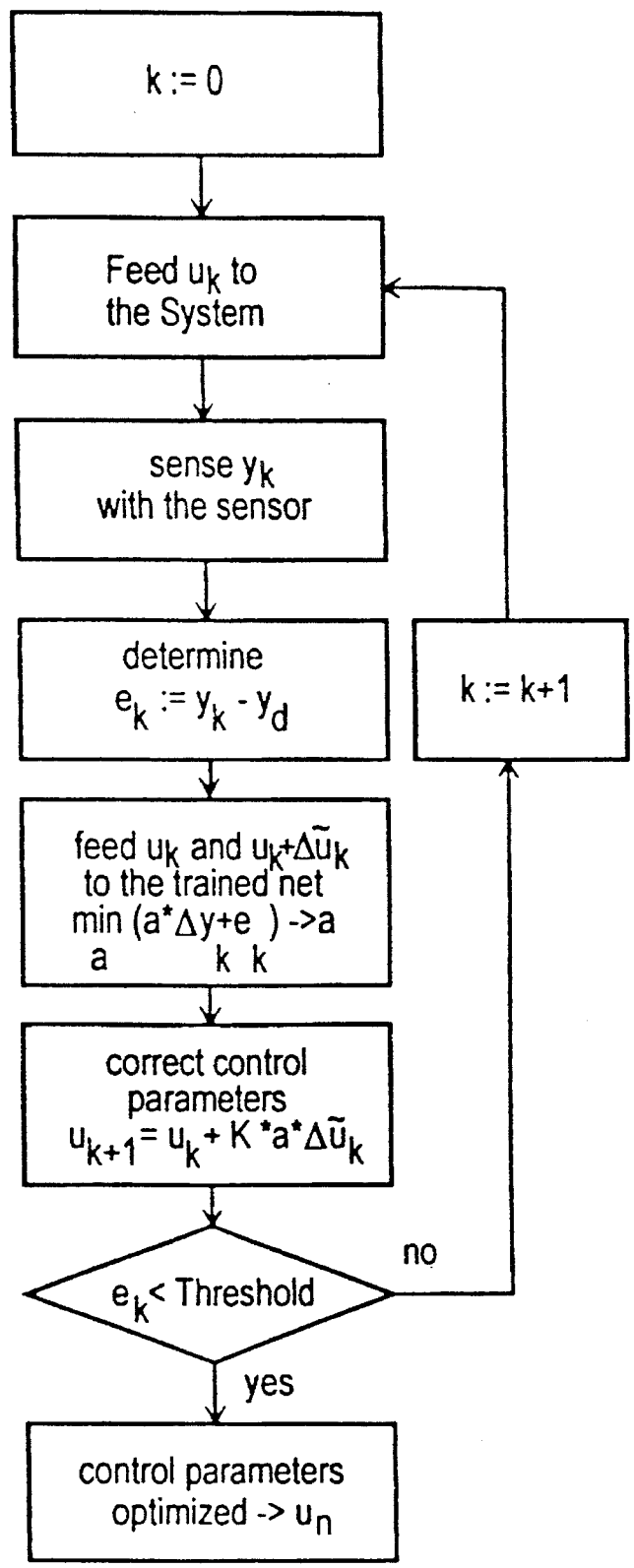
FIG. 16 is a flow chart of teaching control parameters to the backward system.
Figure 17:
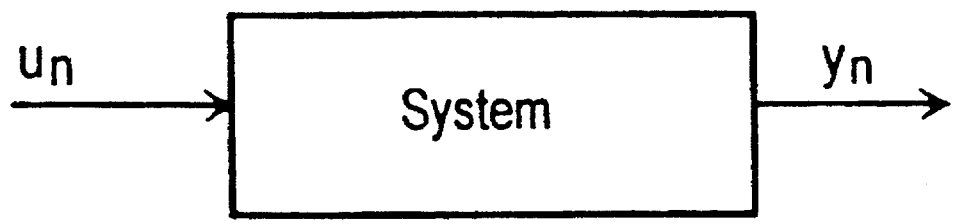
FIG. 17 is a flow chart of system operation.

FIG. 5 shows the optimization of the parameters with two identical forward system models. The learned linear system is used twice to calculate the response $\Delta y \Delta k$ to $\Delta u \Delta k$. The minimization of $(a \cdot \Delta y \Delta k + ek)^2$ leads to such an a, that the deviation ek is minimized by adding $a \cdot \Delta u \Delta k$ to uk. The denotations in this figure are used analogously to FIG. 4.

With the value of a determined one obtains:

$$uk+1 = K \cdot a \cdot \Delta u \Delta K + uK$$

uk+1 leads to a small deviation ek+1. This iteration is performed analogously to that in the parameter optimization with the inverse system model until ek falls below a previously defined value.

The process according to the invention is illustrated in FIG. 6 with reference to the reference trajectory and the actual trajectory of a robot arm and the underlying control parameters. Section A shows the reference trajectory of a robot arm, that is to say the control parameters in the form of xy coordinates, and the actual behavior of the robot arm brought about by the control parameters, taking damping and play in the arm joints into account. The Figure A can be used to form a system model of the robot arm.

This means that the neural network is trained with the corresponding differences between reference and actual trajectory. That is to say, weighting factors are learned for randomly selected path points of the reference trajectory as a function of the difference between reference value and actual value of the respective path points.

FIG. 6B shows the modification of the reference trajectory after the control parameters have been optimized once with the aid of the inverse system model. In comparison with diagram A, it can be seen that the actual trajectory is already closer to the reference trajectory as a result of optimizing the control parameters.

FIG. 6C shows the reference trajectory and the actual trajectory as well as the optimized control parameters after passing through the neural network 6 times. No difference is now detected between the reference and the actual trajectory, and the iteration process for optimizing the control parameters can be terminated.

Although other modifications and changes may be suggested by those skilled in the art, it is the intention of the inventors to embody within the patent warranged hereon all changes and modifications as reasonably and properly come within the scope of their contribution to the art.

We claim:

1. A process for generating control parameters for a reference behavior of a system having an actual behavior depending on control parameters, comprising the steps of:

a) teaching a trainable component said actual behavior of said system, b) determining a difference between said reference behavior and said actual behavior of said system, which is a reference deviation, as a function of said control parameters;

c) supplying said difference to at least one trainable component to which said actual behavior of said system has been taught, d) providing from said at least one trainable component a correction value for said control parameters corresponding to said reference deviation, e) determining new control parameters with aid of said correction value in such a way that said control parameters bring about an improvement of said actual behavior with respect to said reference behavior of said system, and f) performing at least the steps b) through e) until a difference between said reference behavior and said actual behavior of said system falls below a predetermined value.

2. The process as claimed in claim 1, wherein said trainable component is a neural network which is taught, and further comprising the step of:

weighting said at least one control parameter at least one neuron of said neural network for simulating said actual behavior.

3. The process as claimed in claim 2, further comprising the step of: teaching said neural network linear behavior of said system.

4. The process as claimed in claim 2, further comprising the steps of:

teaching said neural network nonlinear behavior of said system, and encoding said control parameters supplied for training said system.

5. The process as claimed in claim 2, further comprising the step of: assigning to at least one neuron a subset of said control parameters known from said actual behavior for learning said reference behavior.

6. The process as claimed in claim 1, wherein said system has at least minimum-phase behavior, wherein said step of teaching said trainable component determines associated control parameters from said actual behavior of said system, and further comprising the step of: determining a control parameter deviation from said reference deviation which is combined with said control parameters that brought about said reference deviation.

7. The process as claimed in claim 1, further comprising the steps of:

using two identically taught trainable components as models, providing a first one of said models with substantially identical control parameters as said control parameters supplied to said system, providing a second one of said models with modified control parameters that are modified as compared to said control parameters supplied to said system, and obtaining a deviation by comparing actual behaviors produced by said first and second models, said deviation corresponds to a modification of said modified control parameters on said second model compared to said control parameters of said system, adapting the modification iteratively so that a square of a sum of said reference deviation brought about by said system and a linear combination of said deviation brought about by said first and second models becomes minimal, and combining the modification of said control parameters found in said adapting step with particular control parameters that brought about said reference deviation of said system.

8. The process as claimed in claim 1, wherein said system comprises a robot arm that guides a tool, and said control parameters are coordinate specifications which are to be included in a trajectory along which said robot arm is to guide said tool, and wherein said actual behavior of said system is described by said trajectory along which said robot arm actually guides said tool.

9. The process as claimed in claim 1, wherein said system comprises a heating system and said control parameters specify a temperature profile with which heated material is to be heated, and wherein said actual behavior is described by an actual temperature waveform of said heated material.

10. The process as claimed in claim 1, further comprising the steps of: determining said actual behavior of said system by sensors.

* * * * *